United States Patent
Ozkan et al.

(10) Patent No.: US 8,226,918 B2
(45) Date of Patent: Jul. 24, 2012

(54) CATALYST SYSTEMS AND USES THEREOF

(75) Inventors: Umit S. Ozkan, Worthington, OH (US);
Erik M. Holmgreen, Columbus, OH (US); Matthew M. Yung, Columbus, OH (US)

(73) Assignee: The Ohio State University, Columbus, OH (US)

( * ) Notice: Subject to any disclaimer, the term of this patent is extended or adjusted under 35 U.S.C. 154(b) by 1627 days.

(21) Appl. No.: 11/410,267

(22) Filed: Apr. 26, 2006

(65) Prior Publication Data

US 2006/0257304 A1    Nov. 16, 2006

Related U.S. Application Data

(60) Provisional application No. 60/674,992, filed on Apr. 26, 2005.

(51) Int. Cl.
*C07C 51/25* (2006.01)
*C07C 51/16* (2006.01)

(52) U.S. Cl. ..................... 423/247; 423/437.2

(58) Field of Classification Search ................ 423/247
See application file for complete search history.

(56) References Cited

U.S. PATENT DOCUMENTS

| 4,297,244 A | 10/1981 | Mooi |
| 4,604,275 A * | 8/1986 | Murib .......................... 423/247 |
| 5,009,872 A * | 4/1991 | Chuang et al. ............. 423/245.3 |
| 5,935,529 A | 8/1999 | Saito et al. |
| 6,093,670 A | 7/2000 | Brown |
| 6,193,942 B1 | 2/2001 | Okuda et al. |
| RE37,406 E | 10/2001 | Behrmann et al. |
| 6,300,268 B1 | 10/2001 | Lapidus et al. |
| 6,455,596 B2 | 9/2002 | Lapidus et al. |
| 6,458,334 B1 | 10/2002 | Tamhankar et al. |
| 6,528,032 B1 * | 3/2003 | Nojima et al. ................. 423/247 |
| 6,548,446 B1 | 4/2003 | Koermer et al. |
| 6,781,018 B2 * | 8/2004 | Liu et al. ....................... 568/470 |
| 6,977,237 B2 | 12/2005 | Geerlings et al. |
| 7,214,331 B2 * | 5/2007 | Jiang et al. .................... 252/373 |
| 2004/0238410 A1 * | 12/2004 | Inoue et al. .................... 208/213 |

OTHER PUBLICATIONS

Chan Kwak, Tae-Jin Park, Dong Jin Suh "Preferential oxidation of carbon monoxide in hydrogen-rich gas over platinum-cobalt-alumina aerogel catalysts" Clean Technology Research Center, Korea Institute of Science and Technology accepted Jul. 26, 2004 Chemical Engineering Science vol. 60, Issue 5, Mar. 2005, pp. 1211-1217.*

* cited by examiner

*Primary Examiner* — Jessica L Ward
*Assistant Examiner* — Alexander Polyansky
(74) *Attorney, Agent, or Firm* — Dinsmore & Shohl, LLP

(57) ABSTRACT

A method of carbon monoxide (CO) removal comprises providing an oxidation catalyst comprising cobalt supported on an inorganic oxide. The method further comprises feeding a gaseous stream comprising CO, and oxygen ($O_2$) to the catalyst system, and removing CO from the gaseous stream by oxidizing the CO to carbon dioxide ($CO_2$) in the presence of the oxidation catalyst at a temperature between about 20 to about 200° C.

2 Claims, No Drawings

CATALYST SYSTEMS AND USES THEREOF

CROSS-REFERENCE TO RELATED APPLICATIONS

This application claims the benefit of U.S. Provisional Application Ser. No. 60/674,992 filed on Apr. 26, 2005, and incorporates the application in its entirety.

STATEMENT REGARDING FEDERALLY SPONSORED RESEARCH OR DEVELOPMENT

The United States Government has rights in this invention pursuant to Contract No. DE-FC26-02NT41610 from the United States Department of Energy, National Energy Technology Laboratory.

FIELD OF THE INVENTION

The present invention is generally directed to systems and methods of catalytic removal of pollutants in a gaseous stream, and is specifically directed to systems and methods of catalytic removal of pollutants at low temperatures.

BACKGROUND OF THE INVENTION

Air pollution continues to be a serious global problem. The present industrial plants and automobiles burn fossil fuels and emit a staggering amount of gaseous pollutants, principally unburned or partially burned fossil fuels, carbon monoxide, nitrogen oxides, and sulfur dioxide. Thus, there is a high demand for air purification methods, which remove these pollutants, such as carbon monoxide.

Numerous technologies have been developed; however, many of these technologies are costly and/or inefficient. As a result, there is a continuing desire to develop systems and methods to effectively remove carbon monoxide from gaseous streams at minimal cost.

SUMMARY OF THE INVENTION

In a first embodiment of the present invention, a method of carbon monoxide (CO) removal is provided. The method comprises providing an oxidation catalyst comprising cobalt supported on an inorganic oxide. The method further comprises feeding a gaseous stream comprising CO, and oxygen ($O_2$) to the catalyst system, and removing CO from the gaseous stream by oxidizing the CO to carbon dioxide ($CO_2$) in the presence of the oxidation catalyst at a temperature between about 20 to about 200° C.

In a second embodiment of the present invention, another method of CO removal is provided. The method comprises providing an oxidation catalyst comprising cobalt on a titania or a zirconia support, feeding a gaseous stream comprising carbon monoxide (CO), and oxygen ($O_2$) to the catalyst system, and oxidizing the CO to carbon dioxide ($CO_2$) in the presence of the oxidation catalyst at a temperature between about 100 to about 200° C.

Additional features and advantages provided by embodiments of the present invention will be more fully understood in view of the following detailed description.

DETAILED DESCRIPTION

A catalyst capable of complete oxidation of CO to $CO_2$ at room temperature has been developed. It consists of a supported transition metal oxide. Complete conversion of CO to $CO_2$ has been demonstrated to occur in ranges of 600 ppm-1.5% CO and 2.5%-10% $O_2$. Temperature ranges in which complete conversion has occurred are from 20° C-200° C.

In accordance with one embodiment of the present invention, a method of carbon monoxide (CO) removal is provided. The method comprises providing an oxidation catalyst comprising cobalt supported on an inorganic oxide. The inorganic oxide, when used in combination with the cobalt, may comprise any material effective at oxidizing CO to carbon dioxide ($CO_2$). The inorganic oxide may include, but is not limited to, titania, zirconia, or combinations thereof. In one embodiment, the catalyst comprises from about 1 to about 10% by weight of cobalt.

The method further comprises feeding a gaseous stream comprising CO, and oxygen ($O_2$) to the catalyst system. The gaseous stream may comprise up to about 3% CO, or in a further embodiment, from about 600 ppm to about 3% CO, or in a further embodiment, from 600 ppm to 1.5% CO. The gaseous stream may comprise less than about 10% $H_2O$, or in a further embodiment, less than about 2% $H_2O$. In one embodiment, the gaseous stream may comprise up to about 15% $O_2$, or in a further embodiment, about 2% to about 10% $O_2$.

The method then includes removing CO from the gaseous stream by oxidizing the CO to $CO_2$ in the presence of the oxidation catalyst at a temperature between about 20 to about 200° C. In a further embodiment, the temperature ranges from between about 100 to about 200° C. It is further contemplated to conduct the oxidation at higher temperatures, for example, up to about 500° C. At temperatures above 100° C., there is less likelihood of catalyst deactivation. In one embodiment, the oxidation of CO to $CO_2$ defines a conversion of about 90% to substantially about 100%. In a further embodiment, the conversion of CO to $CO_2$ is maximized at temperatures between about 100 to about 200° C.

Oxidizing the CO at low temperatures, for example, at room temperature, benefits the system. For instance, minimizing the temperature may minimize the heating and/or electric costs required. Moreover, at temperatures below 200° C., the combustion of hydrocarbons present in the gaseous stream is minimal, and thus does not affect the reaction kinetics of other reactions, for example, the CO oxidation.

The catalyst system may comprise various configurations known to one skilled in the art. In one embodiment, the oxidation catalyst may be disposed on a catalyst bed. In some exemplary embodiments, the catalyst bed may define a powder bed, or a monolith bed structure having the cobalt embedded in the inorganic oxide support. The catalyst can be combined in the system in several ways: producing a bed of powdered catalyst, or impregnating a single monolith support with the oxidation catalyst. The following catalyst production methods provide exemplary procedures for producing the oxidation catalyst of the present invention.

An oxidation catalyst comprised of cobalt supported on either titania or zirconia may be produced through incipient wetness or sol-gel techniques. The catalyst can contain between 1% and 10% cobalt by weight. The incipient wetness catalyst is prepared by first calcining the support (titania or zirconia) at 500° C. for 3 hours. Cobalt is then added to the support by the addition of a cobalt nitrate in water solution, in amount equal to the pore volume of the support. The sample is then dried at 100° C. overnight. After drying, the catalyst sample is calcined in air at temperatures between 300-600° C. for 3 hours. Based on the final desired weight of cobalt, several additions of cobalt nitrate solution may be used. The catalyst can be prepared either by drying, or by calcining the catalysts between cobalt nitrate solution additions. The sol-gel prepared catalysts are synthesized in a single step. A solution of titanium isopropoxide or zirconia propoxide (depending on the desired support material) in isopropyl alcohol is hydrolyzed with a solution of cobalt nitrate in water or ethanol. The water is added under stirring, and once complete the resulting gel is dried in air overnight and then calcined at between 300-600° C. for 3 hours in air.

At room temperature deactivation of the catalysts has been observed, the rate of which appears to be a function of inlet CO concentration. Activity is completely recoverable through a short heat treatment to 100° C. Additionally, performing the oxidation reaction at moderately elevated temperatures prevents deactivation of the catalyst. The catalyst has also been shown to deactivate in the presence of humidified gas streams (2% $H_2O$), but again operation at moderately elevated temperatures prevents this deactivation. The observed operating temperature range necessary to halt deactivation is between 100-200° C.

The method has numerous pollutant removal applications, for example, in respiratory and environmental pollution control processes. The method may be applicable for use in sealed environments, for example, a submarine or a spacecraft. In addition, these catalysts could be used for gas purification in closed-cycle $CO_2$ lasers, and CO gas sensors. Furthermore, the method may be applicable for selectively oxidizing CO in steam reforming reactions, and for fuel cell applications in which CO must be removed from the gas feed to prevent poisoning of the electrodes. This method can also be used to remove CO from indoor air, which would help to prevent bodily harm/death from carbon monoxide poisoning. Furthermore, it can be used to purify exhaust gases from combustion processes.

It is noted that terms like "preferably," "generally," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of CO removal comprising:
   providing an oxidation catalyst prepared by a sol-gel technique, the oxidation catalyst consisting of about 1% to about 10% by weight of cobalt on a zirconia support;
   feeding a gaseous stream comprising 600 ppm to 1.5% carbon monoxide (CO) and 2.5% to 10% oxygen ($O_2$) to the oxidation catalyst; and
   oxidizing the CO to carbon dioxide ($CO_2$) in the presence of the oxidation catalyst at room temperature.

2. The method of claim 1, wherein the sol-gel technique comprises:
   hydrolyzing a solution comprising zirconium propoxide with a solution comprising cobalt nitrate to form a gel;
   drying the gel; and
   calcining the gel at 300° C. to 600° C.

* * * * *